(12) United States Patent
Lippert et al.

(10) Patent No.: US 9,175,747 B2
(45) Date of Patent: Nov. 3, 2015

(54) MULTI-SPEED TRANSMISSION

(71) Applicant: Ford Global Technologies, LLC, Dearborn, MI (US)

(72) Inventors: Robert Scott Lippert, Ann Arbor, MI (US); Jeremy Lynn Hargis, Farmington, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 71 days.

(21) Appl. No.: 13/948,625

(22) Filed: Jul. 23, 2013

(65) Prior Publication Data

US 2015/0031492 A1   Jan. 29, 2015

(51) Int. Cl.
*F16H 3/44* (2006.01)
*F16H 3/62* (2006.01)
*F16H 3/66* (2006.01)

(52) U.S. Cl.
CPC .. *F16H 3/62* (2013.01); *F16H 3/66* (2013.01); *F16H 3/663* (2013.01); *F16H 2200/0047* (2013.01); *F16H 2200/0069* (2013.01); *F16H 2200/0073* (2013.01); *F16H 2200/0086* (2013.01); *F16H 2200/0091* (2013.01); *F16H 2200/201* (2013.01); *F16H 2200/2012* (2013.01); *F16H 2200/2023* (2013.01); *F16H 2200/2043* (2013.01); *F16H 2200/2046* (2013.01); *F16H 2200/2097* (2013.01)

(58) Field of Classification Search
CPC ............ F16H 3/62; F16H 3/66; F16H 3/663; F16H 2200/2012; F16H 220/2043; F16H 2200/0069; F16H 2200/2023; F16H 2200/0091; F16H 2200/201; F16H 2200/2097; F16H 2200/0073; F16H 2200/086; F16H 2200/0047

See application file for complete search history.

(56) References Cited

U.S. PATENT DOCUMENTS

| | | | |
|---|---|---|---|
| 7,273,438 B2 | 9/2007 | Tiesler et al. | |
| 7,524,259 B2* | 4/2009 | Raghavan | 475/286 |
| 7,556,582 B2 | 7/2009 | Gumpoltsberger | |
| 7,575,533 B2 | 8/2009 | Gumpoltsberger | |
| 7,611,438 B2 | 11/2009 | Diosi et al. | |
| 7,632,206 B2 | 12/2009 | Gumpoltsberger | |
| 7,946,949 B2 | 5/2011 | Hart et al. | |
| 7,988,587 B2 | 8/2011 | Hart et al. | |
| 8,021,266 B2 | 9/2011 | Hukill et al. | |
| 8,029,402 B2 | 10/2011 | Phillips et al. | |
| 8,038,565 B2 | 10/2011 | Phillips et al. | |
| 8,043,189 B2 | 10/2011 | Phillips et al. | |
| 8,047,953 B2 | 11/2011 | Wittkopp et al. | |
| 8,088,032 B2 | 1/2012 | Gumpoltsberger et al. | |
| 8,113,983 B2 | 2/2012 | Gumpoltsberger | |
| 8,162,792 B2 | 4/2012 | Phillips et al. | |
| 8,864,618 B1* | 10/2014 | Noh et al. | 475/278 |

(Continued)

*Primary Examiner* — David J Hlavka

(74) *Attorney, Agent, or Firm* — James Dottavio; Brooks Kushman P.C.

(57) ABSTRACT

Transmissions with at least three gearing-arrangements with similar first and second gearing-arrangements that produce a number of transmissions having an eleven forward-speed and two reverse-speed ratios, having ten forward-speed and three reverse-speed ratios, and having five forward-speed and one reverse-speed ratios by selective engagement of three shift-elements in various combinations. Some embodiments include four simple planetary-gearsets and six shift-elements of which two or three are brakes. Another embodiment includes a double-pinion planetary-gearset and six shift-elements of which three are brakes. Other embodiments include three simple planetary-gearsets and five shift-elements of which one or two are brakes.

18 Claims, 9 Drawing Sheets

| | C1 | C2 | C3 | B1 | B2 | B3 | Ratio | Step |
|---|---|---|---|---|---|---|---|---|
| Rev 2 | | | X | X | | X | -3.367 | 1.285 |
| Rev 1 | | | X | X | X | | -4.326 | |
| 1st | | X | | X | | X | 5.370 | |
| 2nd | | X | | X | X | | 4.411 | 1.217 |
| 3rd | | X | | | X | X | 2.996 | 1.472 |
| 4th | | X | X | | X | | 2.258 | 1.327 |
| 5th | | X | X | | | X | 1.757 | 1.285 |
| 6th | X | X | | | X | | 1.399 | 1.256 |
| 7th | X | X | | | | X | 1.164 | 1.202 |
| 8th | X | X | X | | | | 1.000 | 1.164 |
| 9th | X | | X | | | X | 0.816 | 1.225 |
| 10th | X | | X | | X | | 0.775 | 1.053 |
| 11th | X | | | | X | X | 0.657 | 1.180 |

(56) References Cited

U.S. PATENT DOCUMENTS

| | | | |
|---|---|---|---|
| 8,979,701 B2* | 3/2015 | Baldwin | 475/276 |
| 2002/0053005 A1 | 5/2002 | Hori | |
| 2008/0039267 A1* | 2/2008 | Shim | 475/280 |
| 2008/0269005 A1* | 10/2008 | Phillips et al. | 475/276 |
| 2009/0036256 A1 | 2/2009 | Hukill et al. | |
| 2011/0045936 A1 | 2/2011 | Gumpoltsberger et al. | |
| 2011/0045937 A1 | 2/2011 | Gumpoltsberger et al. | |
| 2011/0045942 A1 | 2/2011 | Gumpoltsberger et al. | |
| 2012/0053004 A1 | 3/2012 | Beck et al. | |
| 2012/0053008 A1 | 3/2012 | Beck et al. | |
| 2012/0083381 A1 | 4/2012 | Wittkopp et al. | |
| 2012/0088625 A1 | 4/2012 | Phillips et al. | |
| 2012/0088626 A1 | 4/2012 | Phillips | |
| 2012/0149523 A1 | 6/2012 | Wittkopp et al. | |
| 2012/0149524 A1 | 6/2012 | Phillips et al. | |
| 2012/0172172 A1 | 7/2012 | Gumpoltsberger et al. | |
| 2013/0267366 A1* | 10/2013 | Mellet et al. | 475/5 |
| 2013/0324350 A1* | 12/2013 | Meyer et al. | 475/280 |

* cited by examiner

| | C1 | C2 | C3 | B1 | B2 | B3 | Ratio | Step |
|---|---|---|---|---|---|---|---|---|
| Rev 2 | | | X | X | | X | -3.367 | 1.285 |
| Rev 1 | | | X | X | X | | -4.326 | |
| 1st | | X | | X | | X | 5.370 | |
| 2nd | | X | | X | X | | 4.411 | 1.217 |
| 3rd | | X | | | X | X | 2.996 | 1.472 |
| 4th | | X | X | | X | | 2.258 | 1.327 |
| 5th | | X | X | | | X | 1.757 | 1.285 |
| 6th | X | X | | | X | | 1.399 | 1.256 |
| 7th | X | X | | | | X | 1.164 | 1.202 |
| 8th | X | X | X | | | | 1.000 | 1.164 |
| 9th | X | | X | | | X | 0.816 | 1.225 |
| 10th | X | | X | | X | | 0.775 | 1.053 |
| 11th | X | | | | X | X | 0.657 | 1.180 |

| Beta 1 | 1.916 |
|---|---|
| Beta 2 | 3.560 |
| Beta 3 | 1.830 |
| Beta 4 | 3.700 |

| | C1 | C2 | C3 | B1 | B2 | B3 | Ratio | Step |
|---|---|---|---|---|---|---|---|---|
| Rev 3 | X | X | | | | X | -2.937 | 1.473 |
| Rev 2 | | | X | X | X | | -4.326 | 1.578 |
| Rev 1 | | | X | X | | X | -6.825 | |
| 1st | | X | | X | X | | 4.411 | |
| 2nd | | X | X | | | X | 3.562 | 1.238 |
| 3rd | | X | | | X | X | 2.996 | 1.189 |
| 4th | | X | X | | X | | 2.258 | 1.327 |
| 5th | | X | | X | | X | 1.912 | 1.181 |
| 6th | X | X | | | X | | 1.399 | 1.367 |
| 7th | X | X | X | | | | 1.000 | 1.399 |
| 8th | X | | X | | X | | 0.775 | 1.290 |
| 9th | X | | X | | | X | 0.727 | 1.066 |
| 10th | X | | | X | X | | 0.657 | 1.107 |

| Beta 1 | 1.916 |
|---|---|
| Beta 2 | 3.560 |
| Beta 5 | 1.830 |
| Beta 6 | 3.700 |

| | C1 | C2 | C3 | B1 | B2 | B3 | Ratio | Step |
|---|---|---|---|---|---|---|---|---|
| Rev 3 | X | X | | | X | | -1.074 | 5.383 |
| Rev 2 | | | X | X | | X | -5.781 | 1.260 |
| Rev 1 | | | X | X | X | | -7.286 | |
| 1st | | X | | X | | | 3.803 | |
| 2nd | X | X | | | | X | 3.148 | 1.208 |
| 3rd | | X | X | | | X | 3.017 | 1.043 |
| 4th | | X | | | X | X | 2.996 | 1.007 |
| 5th | | X | | X | | X | 2.956 | 1.014 |
| 6th | | X | | X | X | | 1.451 | 2.037 |
| 7th | X | X | X | | | | 1.000 | 1.451 |
| 8th | X | | X | | | X | 0.741 | 1.349 |
| 9th | X | | X | | X | | 0.722 | 1.026 |
| 10th | X | | | X | X | | 0.657 | 1.099 |

| Beta 1 | 1.916 |
|---|---|
| Beta 2 | 3.560 |
| Beta 7 | 3.700 |
| Beta 8 | 1.830 |

| | C1 | C2 | C3 | B1 | B2 | B3 | Ratio | Step |
|---|---|---|---|---|---|---|---|---|
| Rev 3 | X | X | | | X | | -2.444 | 2.147 |
| Rev 2 | | | X | X | | X | -5.246 | 1.314 |
| Rev 1 | | | X | X | X | | -6.893 | |
| 1st | | X | | X | | X | 3.598 | |
| 2nd | | X | | | X | X | 3.491 | 1.031 |
| 3rd | | X | | | X | X | 2.996 | 1.165 |
| 4th | | X | X | | | X | 2.738 | 1.094 |
| 5th | X | X | | | | X | 1.992 | 1.375 |
| 6th | | X | | X | X | | 1.844 | 1.080 |
| 7th | X | X | X | | | | 1.000 | 1.844 |
| 8th | X | | X | | | X | 0.751 | 1.331 |
| 9th | X | | X | X | | | 0.726 | 1.034 |
| 10th | X | | | X | | X | 0.657 | 1.105 |

| Beta 1 | 1.916 |
|---|---|
| Beta 2 | 3.560 |
| Beta 9 | 3.700 |
| Beta 10 | 1.830 |

| | C1 | C2 | C3 | C4 | B1 | B2 | Ratio | Step |
|---|---|---|---|---|---|---|---|---|
| Rev 2 | | | X | X | X | | -3.367 | 1.285 |
| Rev 1 | | | X | | X | X | -4.326 | |
| 1st | | X | | X | X | | 5.370 | |
| 2nd | | X | | | X | X | 4.411 | 1.217 |
| 3rd | | X | | X | | X | 2.996 | 1.472 |
| 4th | | X | X | | | X | 2.258 | 1.327 |
| 5th | | X | X | X | | | 1.757 | 1.285 |
| 6th | X | X | | | | X | 1.399 | 1.256 |
| 7th | X | X | | X | | | 1.164 | 1.202 |
| 8th | X | X | X | | | | 1.000 | 1.164 |
| 9th | X | | X | X | | | 0.816 | 1.225 |
| 10th | X | | X | | | X | 0.775 | 1.054 |
| 11th | X | | | X | | X | 0.657 | 1.179 |

| Beta 1 | 1.916 |
|---|---|
| Beta 2 | 3.560 |
| Beta 11 | 1.830 |
| Beta 12 | 3.700 |

| | C1 | C2 | C3 | C5 | B1 | B2 | Ratio | Step |
|---|---|---|---|---|---|---|---|---|
| Rev 2 | | | X | X | X | | -3.367 | 1.285 |
| Rev 1 | | | X | X | | X | -4.326 | |
| 1st | | X | | X | X | | 5.370 | |
| 2nd | | X | | | X | X | 4.411 | 1.217 |
| 3rd | | X | | X | | X | 2.996 | 1.472 |
| 4th | | X | X | | | X | 2.258 | 1.327 |
| 5th | | X | X | X | | | 1.757 | 1.285 |
| 6th | X | X | | | | X | 1.399 | 1.256 |
| 7th | X | X | | X | | | 1.164 | 1.202 |
| 8th | X | X | X | | | | 1.000 | 1.164 |
| 9th | X | | X | X | | | 0.816 | 1.225 |
| 10th | X | | X | | | X | 0.775 | 1.054 |
| 11th | X | | | X | | X | 0.657 | 1.179 |

| Beta 1 | 1.916 |
|---|---|
| Beta 2 | 3.560 |
| Beta 13 | 1.830 |
| Beta 14 | 3.700 |

| | C1 | C2 | C3 | B1 | B2 | Ratio | Step |
|---|---|---|---|---|---|---|---|
| Rev | | | X | X | X | -4.326 | |
| 1st | | X | | X | X | 4.411 | |
| 2nd | | X | X | | X | 2.258 | 1.953 |
| 3rd | X | X | | | X | 1.399 | 1.614 |
| 4th | X | X | X | | | 1.000 | 1.399 |
| 5th | X | | X | | X | 0.775 | 1.291 |

| Beta 1 | 1.916 |
|---|---|
| Beta 2 | 3.560 |
| Beta 15 | 1.830 |

| | C1 | C2 | C3 | C6 | B1 | Ratio | Step |
|---|---|---|---|---|---|---|---|
| Rev | | | X | X | X | -4.326 | |
| 1st | | X | | X | X | 4.411 | |
| 2nd | | X | X | X | | 2.258 | 1.953 |
| 3rd | X | X | | X | | 1.399 | 1.614 |
| 4th | X | X | X | | | 1.000 | 1.399 |
| 5th | X | | X | X | | 0.775 | 1.291 |

| Beta 1 | 1.916 |
|---|---|
| Beta 2 | 3.560 |
| Beta 16 | 1.830 |

| | C1 | C2 | C3 | C7 | B1 | Ratio | Step |
|---|---|---|---|---|---|---|---|
| Rev | | | X | X | X | -4.326 | |
| 1st | | X | | X | X | 4.411 | |
| 2nd | | X | X | X | | 2.258 | 1.953 |
| 3rd | X | X | | X | | 1.399 | 1.614 |
| 4th | X | X | X | | | 1.000 | 1.399 |
| 5th | X | | X | X | | 0.775 | 1.291 |

| Beta 1 | 1.916 |
|---|---|
| Beta 2 | 3.560 |
| Beta 17 | 1.830 |

MULTI-SPEED TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input-shaft driven by an engine crankshaft, and an output-shaft driving the vehicle wheels, often via a differential assembly which permits the left and right wheel to rotate at slightly different speeds as the vehicle turns.

Some vehicles are equipped with a transfer case which directs the power to both front wheels and rear wheels. Some transfer cases provide multiple transfer case ratios between the transmission output-shaft and the differential such that a driver can select a high range and a low range. The high range may be selected for on-road transportation while the low range may be used to provide higher speed ratios for off-road use. When a two speed transfer case is present, the overall ratio is the product of the transmission ratio and the transfer case ratio. In some situations, such as transitioning from on-road to off-road or from off-road to on-road conditions, it is desirable to shift between high and low range while the vehicle is moving, preferably without interrupting the flow of power to the vehicle wheels. In a transverse front wheel drive vehicle, space limitations usually preclude use of a two speed transfer case.

SUMMARY

One aspect of this disclosure is directed to a transmission having a first gearing-arrangement configured to impose a linear speed relationship among an output-shaft, a first-shaft, and a second-shaft. This transmission also has a second gearing-arrangement configured to impose a linear speed relationship among an input-shaft, a third-shaft, and a fourth-shaft. The transmission has a first-clutch configured to selectively couple the input-shaft to the first-shaft, a second-clutch configured to selectively couple the first-shaft to the third-shaft, and a third-clutch configured to selectively couple the second-shaft to the third-shaft. The transmission also has a first-brake configured to selectively hold the first-shaft against rotation.

In this aspect of the disclosure, the first and second gearing-arrangements may be planetary-gearsets. The first planetary-gearset may have a first planet-gear connected to the first-shaft, and the second planetary-gearset may have a second planet-gear connected to the third-shaft. The transmission may also include a third gearing-arrangement configured to impose a linear speed relationship among the second-shaft, the fourth-shaft, and a fifth-shaft. The third gearing-arrangement may also be a planetary-gearset. The third planetary-gearset may have a third planet-gear connected to the fourth-shaft. This transmission may include a second-brake to selectively hold the fifth-shaft against rotation.

The transmission may also include a fourth gearing-arrangement. The fourth gearing-arrangement may also be a planetary-gearset. The fourth gearing-arrangement may be configured to impose a linear speed relationship among the second-shaft, the fourth-shaft, and a sixth-shaft. The fourth planetary-gearset may have a fourth planet-gear connected to the fourth-shaft and a third-brake may be used to selectively hold the sixth-shaft against rotation.

Alternatively, the fourth gearing-arrangement may be configured to impose a linear speed relationship among the fourth-shaft, the fifth-shaft, and a sixth-shaft. In this embodiment, a third-brake may be configured to selectively hold the sixth-shaft against rotation.

The fourth gearing-arrangement may also be configured to share a gear with the third gearing-arrangement. The shared gear may be a third ring-gear. In this embodiment, the third gearing-arrangement may also be a double-pinion planetary-gearset. The third and fourth gearing-arrangements may also share a planetary-gear.

Alternatively again, the fourth gearing-arrangement may be configured to impose a linear speed relationship among the second-shaft, a sixth-shaft, and a ground. The transmission casing may be used as the ground, and an element of the gearing-arrangement may be connected to the casing so that rotation of the element is inhibited. In this embodiment, a fourth-clutch may be configured to selectively couple the fourth-shaft to the sixth-shaft.

In yet another alternative, the fourth gearing-arrangement may be configured to impose a linear speed relationship among the fourth-shaft, a sixth-shaft, and a ground. Here again, the transmission casing may be used as the ground, and an element of the gearing-arrangement may be connected to the casing so that it may not rotate. In this embodiment, a fourth-clutch may be configured to selectively couple the second-shaft to the sixth-shaft.

Another aspect of this disclosure is directed to a transmission having a first planetary-gearset connecting an output-shaft, a first-shaft, and a second-shaft. This transmission has a second planetary-gearset connecting an input-shaft, a third-shaft, and a fourth-shaft. This transmission also has a third planetary-gearset connecting at least one of the second-shaft and the fourth-shaft. This transmission has a first-clutch coupling the input-shaft to the first-shaft, a second-clutch coupling the first-shaft to the third-shaft, and a third-clutch coupling the second-shaft to the third-shaft. This transmission also has a first-brake on the first-shaft.

In this aspect of the disclosure, the first planetary-gearset of the transmission may have a first planet-gear connected to the first-shaft, a first sun-gear connected to the second-shaft, and a first ring-gear connected to the output-shaft. The second planetary-gearset of the transmission may have a second planet-gear connected to the third-shaft, a second ring-gear connected to the fourth-shaft, and a second sun-gear connected to the input-shaft. The third planetary-gearset of the transmission may have a third ring-gear connected to the second-shaft, a third planet-gear connected to the fourth-shaft, and a third sun-gear connected to the fifth-shaft.

This transmission may also have a fourth planetary-gearset connecting the second-shaft, fourth-shaft, and a sixth-shaft, with a third-brake on the sixth-shaft. The fourth planetary-gearset may have a fourth planet-gear connected to the fourth-shaft, a fourth ring-gear connected to the second-shaft, and a fourth sun-gear connected to the sixth-shaft.

A further aspect of this disclosure is directed to a transmission with an output-shaft associated with a first end-gear of a first planetary-gearset, an input-shaft associated with a second end-gear of a second planetary-gearset, and a third and fourth planetary-gearset inter-associated by two shafts, wherein at least one of the two shafts is associated with at least one of the first and second planetary-gearsets.

In this aspect of the disclosure, the third and fourth planetary-gearsets may impose a linear speed relationship among four shafts, two of which may be inter-associated therebetween. One of the four shafts may be associated with a fifth end-gear of the first planetary-gearset opposite of the first end-gear. Another of the four shafts may be associated with a sixth end-gear of the second planetary-gearset opposite the second end-gear.

Additionally, the two inter-associated shafts may be a first-shaft and a second-shaft. The first-shaft may be associated with a third end-gear and fourth end-gear of the third and fourth planetary-gearsets, respectively. The second-shaft may be associated with a first interior-gear and second interior-gear of the third and fourth planetary-gearsets, respectively. The first-shaft may be associated with a fifth end-gear of the first planetary-gearset opposite of the first end-gear, and the second-shaft may be associated with a sixth end-gear of the second planetary-gearset opposite the second end-gear.

BRIEF DESCRIPTION OF THE DRAWINGS

FIG. 1a is a schematic diagram of a first-transmission.
FIG. 1b is a shift-element chart for the transmission in FIG. 1a.
FIG. 1c is a beta ratio chart for the transmission in FIG. 1a.
FIG. 2a is a schematic diagram of a second-transmission.
FIG. 2b is a shift-element chart for the transmission in FIG. 2a.
FIG. 2c is a beta ratio chart for the transmission in FIG. 2a.
FIG. 3a is a schematic diagram of a third-transmission.
FIG. 3b is a shift-element chart for the transmission in FIG. 3a.
FIG. 3c is a beta ratio chart for the transmission in FIG. 3a.
FIG. 4a is a schematic diagram of a fourth-transmission.
FIG. 4b is a shift-element chart for the transmission in FIG. 4a.
FIG. 4c is a beta ratio chart for the transmission in FIG. 4a.
FIG. 5a is a schematic diagram of a fifth-transmission.
FIG. 5b is a shift-element chart for the transmission in FIG. 5a.
FIG. 5c is a beta ratio chart for the transmission in FIG. 5a.
FIG. 6a is a schematic diagram of a sixth-transmission.
FIG. 6b is a shift-element chart for the transmission in FIG. 6a.
FIG. 6c is a beta ratio chart for the transmission in FIG. 6a.
FIG. 7a is a schematic diagram of a seventh-transmission.
FIG. 7b is a shift-element chart for the transmission in FIG. 7a.
FIG. 7c is a beta ratio chart for the transmission in FIG. 7a.
FIG. 8a is a schematic diagram of an eighth-transmission.
FIG. 8b is a shift-element chart for the transmission in FIG. 8a.
FIG. 8c is a beta ratio chart for the transmission in FIG. 8a.
FIG. 9a is a schematic diagram of a ninth-transmission.
FIG. 9b is a shift-element chart for the transmission in FIG. 9a.
FIG. 9c is a beta ratio chart for the transmission in FIG. 9a.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figures 1A, 1B, 1C:
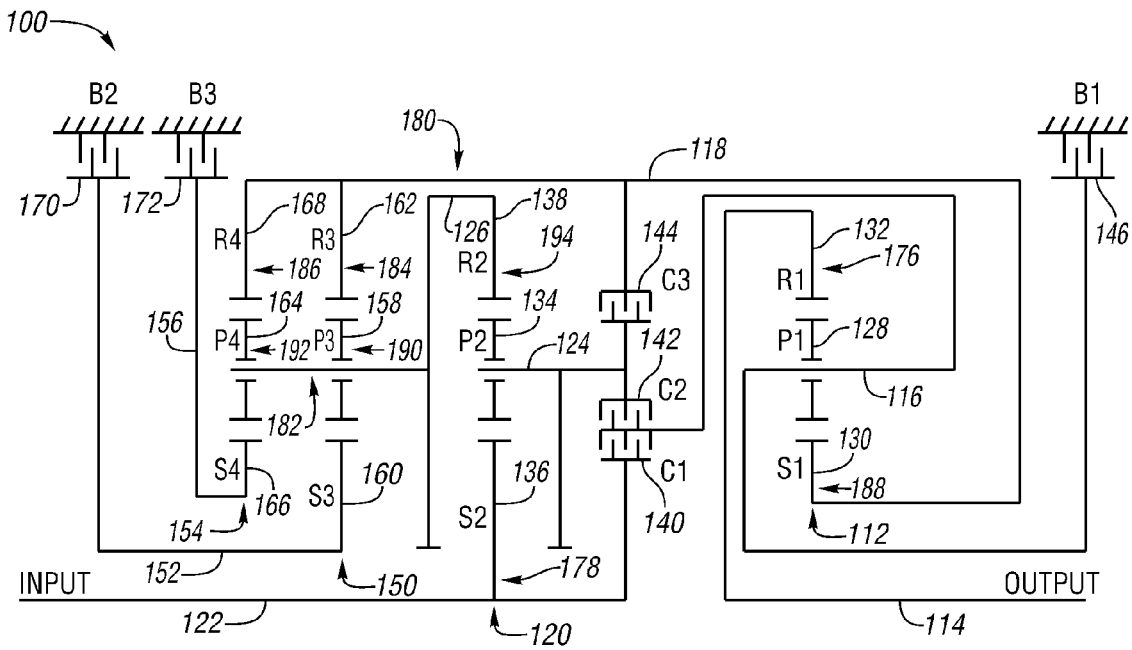

FIG. 1a shows a schematic diagram of a first-transmission 100. The schematic diagramming of a transmission may be referred to as a stick diagram and the lines on the stick diagram may represent gearing-arrangements made up of gear-elements, shafts associated with the gear-elements, and the interconnection of the shafts with other shafts, gear-elements, or the transmission housing. A shaft may be any physical object used to transfer the movement (or non-movement) of an associated gear-element to another location, or to move (or hold) an associated gear-element in response to the shaft receiving that motion (or non-motion) from another location. The term associated, as used here, means that the shaft is rotated by the gear-element with which it is associated, and vice versa.

A gearing-arrangement is a collection of meshing gear-elements configured to impose specified speed relationships among the gear-elements. The speed relationships among the gear-elements may be determined by the number of teeth of the respective gear-elements. A linear speed relationship exists among an ordered list of gear-elements when i) the first and last gear-element in the group are constrained to have the most extreme speeds, ii) the speeds of the remaining gear-elements are each constrained to be a weighted average of the first and last gear-element, and iii) when the speeds of the gear-elements differ, they are constrained to be in the listed order, either increasing or decreasing. The speed of a gear-element is positive when the gear-element rotates in one direction and negative when the gear-element rotates in the opposite direction. A discrete ratio transmission has a gearing-arrangement that selectively imposes a variety of speed ratios between an input-shaft and an output-shaft. Shafts associated with the gear-elements of a gearing-arrangement may be referred to as connected by the gearing-arrangement.

A group of gear-elements are fixedly coupled to one another if they are constrained to rotate as a unit in all operating conditions. The multiple gear-elements would be associated with the same shaft, or one shaft would be considered to be associated with a number of gear-elements. Gear-elements may be fixedly coupled by spline connections, welding, press fitting, machining from a common solid, or other means. Slight variations in rotational displacement between fixedly coupled gear-elements may occur such as displacement due to lash or shaft compliance. A single gear-element fixedly coupled to the transmission housing is constrained such that it does not experience rotation and may be referred to as a ground.

A gear-element or shaft may be selectively coupled to another gear-element, shaft or to the transmission housing by a shift-element when the shift-element constrains them to rotate (or to not rotate in the case of coupling with the housing) as a unit whenever it is fully engaged. In the case of selectively coupling two gear-elements, they are free to rotate at distinct speeds when the shift-element is not fully engaged. The two gear-elements would be considered to be associated with two different shafts regardless of the shift-element constraint. A shift-element that selectively couples two or more gear-elements or shafts to one another may be referred to as a clutch. A shift-element that holds a gear-element or shaft against rotation by selectively connecting it to the housing may be referred to as a brake. Shift-elements may be actively controlled devices such as hydraulically or electrically actuated clutches or brakes or may be passive devices such as one way clutches or brakes. Two gear-elements may be referred to simply as coupled if they are either fixedly coupled or selectively coupled.

Regarding the first-transmission 100, a first gearing-arrangement 112 is shown which is configured to impose a linear speed relationship among an output-shaft 114, a first-shaft 116 and a second-shaft 118. A second gearing-arrangement 120 is shown which is configured to impose a linear speed relationship among an input-shaft 122, a third-shaft 124, and a fourth-shaft 126. Input-shaft 122 may be connected to an engine crankshaft or a torque converter (not shown). Output-shaft 114 may be connected to a transfer case or differential assembly (not shown) and may be used to drive the vehicle wheels.

A gearing-arrangement may be a planetary-gearset, having at least one planet-gear disposed between a sun-gear and a ring-gear. The planet-gear may be associated with a shaft referred to as a planet-carrier. Planetary-gearsets may be simple or double-pinion. A simple planetary-gearset is a type of gearing-arrangement that imposes a fixed linear speed relationship among a sun-gear, a planet-carrier, and a ring-gear. In a simple planetary-gearset the planet-carrier is associated with at least one planet-gear which is disposed between and is in contact with both the sun-gear and the ring-gear. A double-pinion planetary-gearset also may impose a linear speed relationship between a sun-gear, a ring-gear, and a planet-carrier. In a double-pinion planetary-gearset, however, the planet-carrier is associated with at least a pair of planet-gears which are disposed between the sun-gear and the ring-gear, wherein a first of the pair of planet-gears is in contact with the sun-gear while not being in contact with the ring-gear, the second of the pair of planet-gears is in contact with the ring-gear while not being in contact with the sun-gear, and the pair of planetary-gears are in contact with each other.

The first gearing-arrangement 112 may be a first planetary-gearset 112, although other gearing configurations may be used. FIG. 1*a* depicts the first gearing-arrangement 112 as a simple planetary-gearset used to connect the output-shaft 114, the first-shaft 116, and the second-shaft 118. The first planetary-gearset 112 may have a first planet-gear 128 associated with the first-shaft 116. The first planetary-gearset 112 may also have a first sun-gear 130 associated with the second-shaft 118 and a first ring-gear 132 associated with the output-shaft 114.

The second gearing-arrangement 120 may be a second planetary-gearset 120, although other gearing configurations may be used as well. FIG. 1*a* depicts the second gearing-arrangement 120 as a simple planetary-gearset used to connect the input-shaft 122, the third-shaft 124, and the fourth-shaft 126. The second planetary-gearset 120 may have a second planet-gear 134 associated with the third-shaft 124. The second planetary-gearset 120 may also have a second sun-gear 136 associated with the input-shaft 122 and a second ring-gear 138 associated with the fourth-shaft 126.

The first-transmission 100 may have a first-clutch 140 configured to selectively couple the input-shaft 122 to the first-shaft 116, a second-clutch 142 configured to selectively couple the first-shaft 116 to the third-shaft 124, and a third-clutch 144 configured to selectively couple the second-shaft 118 to the third-shaft 124. The first-transmission 100 may also have a first-brake 146 configured to selectively hold the first-shaft 116 against rotation.

First-transmission 100 may also have a third gearing-arrangement 150 configured to impose a linear speed relationship among the second-shaft 118, the fourth-shaft 126, and a fifth-shaft 152, as well as a fourth gearing-arrangement 154 configured to impose a linear speed relationship among the second-shaft 118, the fourth-shaft 126, and a sixth-shaft 156. At least one gear-element from both the third and fourth gearing-arrangements 150, 154 are associated with both the second-shaft 118 and the fourth-shaft 126.

The third gearing-arrangement 150 may be a third planetary-gearset 150, although other gearing configurations may be used. The third planetary-gearset 150 may connect at least one of the second-shaft 118 and the fourth-shaft 126. FIG. 1*a* depicts the third gearing-arrangement 150 as a simple planetary-gearset used to connect the second-shaft 118, the fourth-shaft 126, and the fifth-shaft 152. The third planetary-gearset 150 may have a third planet-gear 158 associated with the fourth-shaft 126. The third planetary-gearset 150 may also have a third sun-gear 160 associated with the fifth-shaft 152 and a third ring-gear 162 associated with the second-shaft 118.

The fourth gearing-arrangement 154 may be a fourth planetary-gearset 154, although other gearing configurations may be used. The fourth planetary-gearset 154 may also connect at least one of the second-shaft 118 and the fourth-shaft 126. FIG. 1*a* depicts the fourth gearing-arrangement 154 as a simple planetary-gearset used to connect the second-shaft 118, the fourth-shaft 126, and the sixth-shaft 156. The fourth planetary-gearset 154 may have a fourth planet-gear 164 associated with the fourth-shaft 126. The fourth planetary-gearset 154 may also have a fourth sun-gear 166 associated with the sixth-shaft 156 and a fourth ring-gear 168 associated with the second-shaft 118. The fourth planet-gear 164 is shown as a separate gear-element from the third planet-gear 158, however a shared gear-element may be used. As well, the fourth ring-gear 168 is shown as a separate gear-element from the third ring-gear 162, however a shared gear-element may be used.

The first-transmission 100 may have a second-brake 170 configured to selectively hold the fifth-shaft 152 against rotation. The first-transmission 100 may also have a third-brake 172 configured to selectively hold the sixth-shaft 156 against rotation.

The linear speed relationships of the ordered gear-elements in a planetary-gearset may be controlled by changing from a simple planetary-gearset to a double-pinion planetary-gearset. In a simple planetary-gearset the linear speed relationship may be from a sun-gear through a planet-gear to a ring-gear, or vice versa, and thus the linear speed relationship of the associated shafts may follow. For example, if the shaft associated with the sun-gear is held with no rotation (braked), then the shaft associated with the ring-gear may have a greater rotational speed than the shaft associated with the planet-gear. This order may be changed by switching to a double-pinion planetary-gearset. The linear speed relationship of a double-pinion planetary-gearset may be from the sun-gear through the ring-gear to the planet-gear, and thus the linear speed relationship of the associated shafts may also follow. For example, if the shaft associated with the sun-gear is held with no rotation (braked), then the shaft associated with the planet-gears may have a greater rotational speed than the shaft associated with the ring-gear.

In other words, the linear speed relationship of a gearing-arrangement may be turned inside out by switching from a simple planetary-gearset to a double-pinion planetary-gearset. This interchangeability provides that the extreme speed gear-elements may be referred to as end-gears, while the gear-element that experiences speed within the extreme speed gear-elements may be referred to as interior-gears. Following the example of the simple planetary-gear set above, the sun-gear and the ring-gear could be referred to as the end-gears while the planet could be referred to as the interior-gear, whereas in the double-pinion gearing-arrangement example above, the sun-gear and the planet-gear could be referred to as the end-gears, while the ring-gear could be referred to as the interior-gear.

Following this terminology, FIG. 1a also shows the output-shaft 114 associated with a first end-gear 176 (first ring-gear 132) of the first planetary-gearset 112, and the input-shaft 122 is shown associated with a second end-gear 178 (second sun-gear 136) of the second planetary-gearset 120. The third planetary-gearset 150 and fourth planetary-gearset 154 are shown inter-associated by two shafts; the second-shaft 118 and the fourth-shaft 126. At least one of the two shafts is associated with a gear-element in at least one of the first and second planetary-gearsets 112, 120. The second-shaft 118 is one of the two shafts and it is associated with a gear-element in the first planetary-gearset 112 and the fourth-shaft 126 is also one of the two shafts and it is associated with a gear-element in the second planetary-gearset 120.

The third and fourth planetary-gearsets 150, 154, having two inter-associated shafts, may impose a linear speed relationship among four shafts; the second-shaft 118, the fourth-shaft 126, the fifth-shaft 152, and the sixth-shaft 156, or the second-shaft 118, the fourth-shaft 126, the sixth-shaft 156, and the fifth-shaft 152 (the last two being interchangeable). The second-shaft 118 is inter-associated with the third ring-gear 162 and the fourth ring-gear 168, and the fourth-shaft 126 is inter-associated with the third planet-gear 158 and the fourth planet-gear 164.

In the case of two gearing-arrangements having two inter-associated shafts, the shafts may be referred to as an alpha-shaft 180 and a beta-shaft 182. FIG. 1a shows the alpha-shaft 180 (second-shaft 118) associated with a third end-gear 184 (third ring-gear 162) and fourth end-gear 186 (fourth ring-gear 168) of the third and fourth planetary-gearsets 150, 154, respectively. The alpha-shaft 180 may also be associated with a fifth end-gear 188 (first sun-gear 130) of the first planetary-gearset 112. The fifth end-gear 188 having an opposite extreme speed of the first end-gear 176.

The beta-shaft 182 (fourth-shaft 126) is shown associated with a first interior-gear 190 (third planet-gear 158) and second interior-gear 192 (fourth planet-gear 164) of the third and fourth planetary-gearsets 150, 154, respectively. The beta-shaft 182 may also be associated with a sixth end-gear 194 (second ring-gear 138) of the second planetary-gearset 120 opposite in the respective speed relationship of the second end-gear 178. In first-transmission 100, the input-shaft 122 is associated with the second end-gear 178 and the output-shaft 114 is associated with the first end-gear 176.

FIG. 1b illustrates a shift-element engagement chart for first-transmission 100. The columns represent the respective shift-elements and the rows represent transmissions speed ratios. An X in a cell indicates that the shift-element of that column is engaged to establish that speed ratio. An automatic transmission may 'shift gears' from one speed to another by selectively engaging and/or disengaging shift-elements. First-transmission 100 may have the shift-elements engaged in varying combinations of three to establish eleven forward speed ratios and two reverse speed ratios between input-shaft 122 and output-shaft 114. Transitioning, or 'shifting,' between speeds may follow a one-off/one-one disengagement/engagement strategy or multiple shift-elements disengaging with simultaneous or time spaced multiple shift-element engagements. Although first-transmission 100 is shown having 11 forward speeds and two reverse speeds available, first-transmission 100 may have a control strategy that only employs a portion of the available speeds when used on a vehicle.

First-transmission 100 may start with a first speed by engaging the second-clutch 142, the first-brake 146, and the third-brake 172. First-transmission 100 may shift from the first speed to a second speed by disengaging the third-brake 172 and engaging the second-brake 170. A subsequent third speed may be achieved by disengaging the first-brake 146 and engaging the third-brake 172. A subsequent fourth speed may be achieved by disengaging the third-brake 172 and engaging the third-clutch 144. A subsequent fifth speed may be achieved by disengaging the second-brake 170 and engaging the third-brake 172. A subsequent sixth speed may be achieved by disengaging the third-clutch 144 and the third-brake 172 and engaging the first-clutch 140 and the second-brake 170. A subsequent seventh speed may be achieved by disengaging the second-brake 170 and engaging the third-brake 172. A subsequent eighth speed may be achieved by disengaging the third-brake 172 and engaging the third-clutch 144. A subsequent ninth speed may be achieved by disengaging the second-clutch 142 and engaging the third-brake 172. A subsequent tenth speed may be achieved by disengaging the third-brake 172 and engaging the second-brake 170. A subsequent eleventh speed may be achieved by disengaging the third-clutch 144 and engaging the third-brake 172.

As mentioned above, when employing a three shift-element engagement per speed strategy, eleven forward speeds are available, however not all speeds must be used on a vehicle. An illustrating example of speed strategy that does not utilize each available speed is a speed strategy in which the above mentioned available sixth speed is skipped. To accomplish this, first-transmission 100 may transition from the fifth speed to the seventh speed in which the third-clutch 144 would be disengaged and the first-clutch 140 engaged. Skipping the sixth speed may allow for a smoother one-off/one-on shift-element disengagement/engagement strategy.

First-transmission 100 may also provide two reverse speeds. A first reverse speed may be achieved by engaging the third-clutch 144, the first-brake 146, and the second-brake 170. A second reverse speed may be achieved by engaging the third-clutch 144, the first-brake 146, and the third-brake 172. Shifting between a first reverse and a second reverse could be achieved by disengaging the second-brake 170 and engaging the third-brake 172.

FIG. 1c is a chart of beta ratios that may be used with first-transmission 100. A beta ratio is a ratio between a pitch diameter of a ring-gear to a pitch diameter of a corresponding sun-gear in a planetary-gearset. In order for a planetary-gearset to function properly, the teeth on each gear-element should be of corresponding pitch so as to mesh with one another. Gear-elements having meshable teeth also provide for the beta ratios to be determined by dividing the number of teeth of a ring-gear by the number of teeth of a corresponding sun-gear. The first planetary-gearset 112 may have a beta ratio, beta 1, of 1.916. The second planetary-gearset 120 may have a beta ratio, beta 2, of 3.560. The third planetary-gearset 150 may have a beta ratio, beta 3, of 1.830. The fourth planetary-gearset 154 may have a beta ratio, beta 4, of 3.700.

When the gearing-arrangements have beta ratios as indicated in FIG. 1c, the speed ratios have the values indicated in the ratio column in FIG. 1b. For example, when the beta ratios of FIG. 1c apply to the first-transmission 100, the speed ratio for the first forward speed ratio is 5.370. While the transmission is operating in the first forward speed, the transmission may shift to the second forward speed having a second forward speed ratio of 4.411. Speed ratios may be modified and tuned by changing the beta ratios, which may be done by increasing or decreasing the number of teeth on corresponding sun-gears or ring-gears.

The far right column in FIG. 1b also shows the steps between the speed ratios, which is the previous speed ratio divided by the current speed ratio. The step between the first forward speed ratio and the second forward speed ratio is 1.217 (=5.370/4.411). Smaller speed steps may be desirable for smoother speed transitions. Smaller speed steps may also allow the engine RPM to be controlled more precisely. Smaller speed steps, however, require more speed transitions to occur as a vehicle increases in overall velocity. Larger speed shifts may be employed to allow for less speed transitions to occur. As mentioned above, when employing a three shift-element engagement per speed strategy, eleven forward speeds are available, however in use, not all speeds may be employed when the transmission is used on a vehicle. Another illustrating example of which may be to skip the second speed in FIG. 1b and shift from the first speed to the third speed in which the first-brake 146 would be disengaged and the second-brake 170 engaged. Skipping the second speed may allow for a larger speed step of 1.792 (=5.370/2.996), and thus one less speed transition may be utilized. Skipping of speeds may be performed during different vehicle accelerations, an example of which would be during rapid acceleration in which higher RPM of the engine is desired before transmission speed transition and then a higher transmission speed could be engaged when the speed transition occurs.

Figures 2A, 2B, 2C:
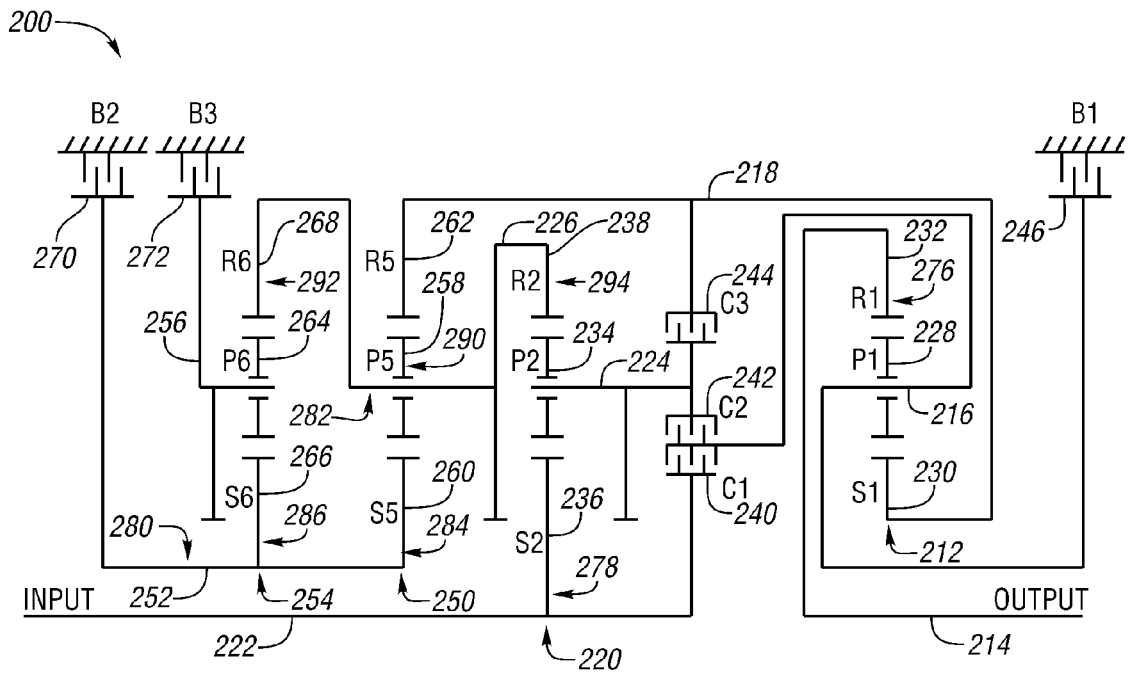

FIG. 2a shows a schematic diagram of a second-transmission 200. Regarding the second-transmission 200, a first gearing-arrangement 212 is shown which connects an output-shaft 214, a first-shaft 216 and a second-shaft 218. Similar to the first-transmission 100, the first gearing-arrangement 212 may be a first simple planetary-gearset 212 which is configured to impose a linear speed relationship among the output-shaft 214, the first-shaft 216 and the second-shaft 218. A second gearing-arrangement 220 is shown which connects an input-shaft 222, a third-shaft 224, and a fourth-shaft 226. Similar to the first-transmission 100, the second gearing-arrangement 220 may be a second simple planetary-gearset 220 which is configured to impose a linear speed relationship among the input-shaft 222, the third-shaft 224, and the fourth-shaft 226.

The first simple planetary-gearset 212 may have a first planet-gear 228 associated with the first-shaft 216. The first simple planetary-gearset 212 may also have a first sun-gear 230 associated with the second-shaft 218 and a first ring-gear 232 associated with the output-shaft 214. The second simple planetary-gearset 220 may have a second planet-gear 234 associated with the third-shaft 224. The second simple planetary-gearset 220 may also have a second sun-gear 236 associated with the input-shaft 222 and a second ring-gear 238 associated with the fourth-shaft 226.

Also similar to the first-transmission 100, the second-transmission 200 may have a first-clutch 240 configured to selectively couple the input-shaft 222 to the first-shaft 216, a second-clutch 242 configured to selectively couple the first-shaft 216 to the third-shaft 224, and a third-clutch 244 configured to selectively couple the second-shaft 218 to the third-shaft 224. As well the second-transmission 200 may have a first-brake 246 configured to selectively hold the first-shaft 216 against rotation.

Second-transmission 200 may have a fifth gearing-arrangement 250 which connects the second-shaft 218, the fourth-shaft 226, and a fifth-shaft 252. The fifth gearing-arrangement 250 may be a fifth simple planetary-gearset 250 which is configured to impose a linear speed relationship among the second-shaft 218, the fourth-shaft 226, and the fifth-shaft 252. A sixth gearing-arrangement 254 may connect the fourth-shaft 226, the fifth-shaft 252 and a sixth-shaft 256. The sixth gearing-arrangement 254 may be a sixth simple planetary-gearset 254 which is configured to impose a linear speed relationship among the fourth-shaft 226, the fifth-shaft 252 and a sixth-shaft 256. At least one gear-element from both the fifth and sixth gearing-arrangements 250, 254 are associated with both the fourth-shaft 226 and the fifth-shaft 252.

The fifth simple planetary-gearset 250 may connect at least one of the second-shaft 218 and the fourth-shaft 226. The fifth simple planetary-gearset 250 may have a fifth planet-gear 258 associated with the fourth-shaft 226. The fifth simple planetary-gearset 250 may also have a fifth sun-gear 260 associated with the fifth-shaft 252 and a fifth ring-gear 262 associated with the second-shaft 218. The sixth simple planetary-gearset 254 may also connect at least one of the second-shaft 218 and the fourth-shaft 226. The sixth simple-planetary-gearset 254 may have a sixth planet-gear 264 associated with the sixth-shaft 256. The sixth simple planetary-gearset 254 may also have a sixth sun-gear 266 associated with the fifth-shaft 252 and a sixth ring-gear 268 associated with the fourth-shaft 226. The fifth sun-gear 260 and sixth sun-gear 266 are shown as separate gear-elements, however a shared gear element could be used.

The second-transmission 200 may have a second-brake 270 configured to selectively hold the fifth-shaft 252 against rotation. The second-transmission 200 may also have a third-brake 272 configured to selectively hold the sixth-shaft 256 against rotation.

The fifth and sixth simple planetary-gearsets 250, 254, having two inter-associated shafts, may impose a linear speed relationship among four shafts; the second-shaft 218, the fourth-shaft 226, the sixth-shaft 256, and the fifth-shaft 252. The fourth-shaft 226 is inter-associated with the fifth planet-gear 258 and the sixth ring-gear 268, and the fifth-shaft 252 is inter-associated with the fifth sun-gear 260 and the sixth sun-gear 266.

FIG. 2a also shows the output-shaft 214 associated with a first end-gear 276 of the first simple planetary-gearset 212, and the input-shaft 222 is shown associated with a second end-gear 278 of the second simple planetary-gearset 220. The fifth simple planetary-gearset 250 and sixth simple planetary-gearset 254 are shown inter-associated by two shafts; an alpha-shaft 280 and a beta-shaft 282. At least one of the inter-associated shafts is associated with a gear-element in at least one of the first and second simple planetary-gearsets 212, 220; the beta-shaft 282 is associated with a gear-element in the second planetary-gearset 220.

The alpha-shaft 280 may be associated with a third end-gear 284 and a fourth end-gear 286 of the fifth and sixth simple planetary-gearsets 250, 254, respectively. The beta-shaft 282 may be associated with a first interior-gear 290 and fifth end-gear 292 of the fifth and sixth simple planetary-gearsets 250, 254, respectively. The beta-shaft 282 may also be associated with a sixth end-gear 294 of the second simple planetary-gearset 220 opposite in the respective speed relationship of the second end-gear 278.

FIG. 2b illustrates a shift-element engagement chart for second-transmission 200. Second-transmission 200 may have the shift-elements engaged in varying combinations of three to establish ten forward speed ratios and three reverse speed ratios between input-shaft 222 and output-shaft 214.

Second-transmission 200 may start with a first speed by engaging the second-clutch 242, the first-brake 246, and the second-brake 270. Second-transmission 200 may shift from the first speed to a second speed by disengaging the first-brake 246 and second-brake 270 and engaging the third-clutch 244 and third-brake 272. A subsequent third speed may be achieved by disengaging the third-clutch 244 and engaging the second-brake 270. A subsequent fourth speed may be achieved by disengaging the third-brake 272 and engaging the third-clutch 244. A subsequent fifth speed may be achieved by disengaging the third-clutch 244 and the second-brake 270 and engaging the first-brake 246 and the third-brake 272. A subsequent sixth speed may be achieved by disengaging the first-brake 246 and the third-brake 272 and engaging the first-clutch 240 and the second-brake 270. A subsequent seventh speed may be achieved by disengaging the second-brake 270 and engaging the third-clutch 244. A subsequent eighth speed may be achieved by disengaging the second-clutch 242 and engaging the second-brake 270. A subsequent ninth speed may be achieved by disengaging the second-brake 270 and engaging the third-brake 272. A subsequent tenth speed may be achieved by disengaging the third-clutch 244 and engaging the second-brake 270.

Second-transmission 200 may also provide three reverse speeds. A first reverse speed may be achieved by engaging the third-clutch 244, the first-brake 246, and the third-brake 272. A second reverse speed may be achieved by engaging the third-clutch 244, the first-brake 246, and the second-brake 270. A third reverse speed may be achieved by engaging the first-clutch 240, the second-clutch 242, and the third-brake 272.

FIG. 2c is a chart of beta ratios that may be used with second-transmission 200. The first simple planetary-gearset 212 may have a beta ratio, beta 1, of 1.916. The second simple planetary-gearset 220 may have a beta ratio, beta 2, of 3.560. The fifth simple planetary-gearset 250 may have a beta ratio, beta 5, of 1.830. The sixth simple planetary-gearset 254 may have a beta ratio, beta 6, of 3.700.

When the gearing-arrangements have beta ratios as indicated in FIG. 2c, the speed ratios have the values indicated in the ratio column in FIG. 2b. The far right column in FIG. 2b also shows the steps between the speed ratios. For example, when the beta ratios of FIG. 2c apply to the second-transmission 200, the speed ratio for the first forward speed ratio is 4.411, the transmission may shift to the second forward speed having a second forward speed ratio of 3.562, and the resulting step between the first forward speed ratio and the second forward speed ratio will be 1.238.

Figures 3A, 3B, 3C:
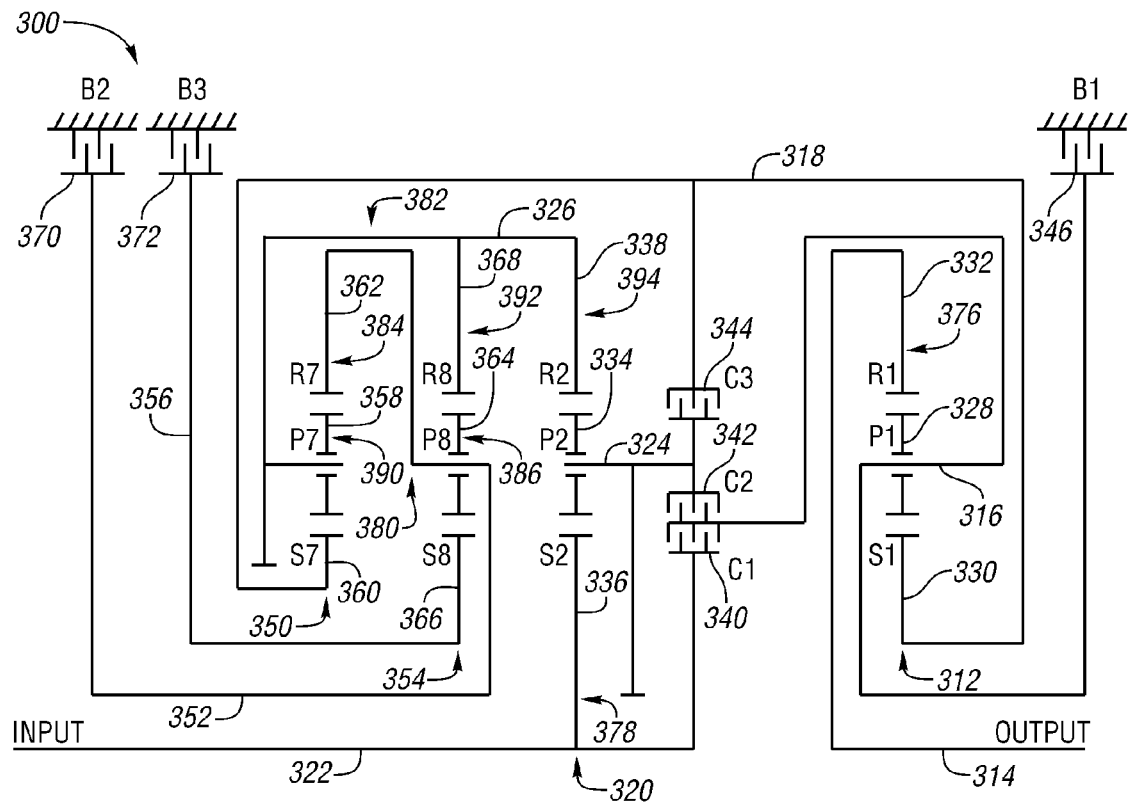

FIG. 3a shows a schematic diagram of a third-transmission 300. Regarding the third-transmission 300, a first gearing-arrangement 312 is shown which connects an output-shaft 314, a first-shaft 316 and a second-shaft 318. Similar to the first-transmission 100, the first gearing-arrangement 312 may be a first simple planetary-gearset 312 which is configured to impose a linear speed relationship among the output-shaft 314, the first-shaft 316 and the second-shaft 318. A second gearing-arrangement 320 is shown which connects an input-shaft 322, a third-shaft 324, and a fourth-shaft 326. Similar to the first-transmission 100, the second gearing-arrangement 320 may be a second simple planetary-gearset 320 which is configured to impose a linear speed relationship among the input-shaft 322, the third-shaft 324, and the fourth-shaft 326.

The first simple planetary-gearset 312 may have a first planet-gear 328 associated with the first-shaft 316. The first simple planetary-gearset 312 may also have a first sun-gear 330 associated with the second-shaft 318 and a first ring-gear 332 associated with the output-shaft 314. The second simple planetary-gearset 320 may have a second planet-gear 334 associated with the third-shaft 324. The second simple planetary-gearset 320 may also have a second sun-gear 336 associated with the input-shaft 322 and a second ring-gear 338 associated with the fourth-shaft 326.

Also similar to the first-transmission 100, the third-transmission 300 may have a first-clutch 340 configured to selectively couple the input-shaft 322 to the first-shaft 316, a second-clutch 342 configured to selectively couple the first-shaft 316 to the third-shaft 324, and a third-clutch 344 configured to selectively couple the second-shaft 318 to the third-shaft 324. As well the third-transmission 300 may have a first-brake 346 configured to selectively hold the first-shaft 316 against rotation.

Third-transmission 300 may have a seventh gearing-arrangement 350 which connects the second-shaft 318, the fourth-shaft 326, and a fifth-shaft 352. The seventh gearing-arrangement 350 may be a seventh simple planetary-gearset 350 which is configured to impose a linear speed relationship among the second-shaft 318, the fourth-shaft 326, and the fifth-shaft 352. An eighth gearing-arrangement 354 may connect the fourth-shaft 326, the fifth-shaft 352 and a sixth-shaft 356. The eighth gearing-arrangement 354 may be a sixth simple planetary-gearset 354 which is configured to impose a linear speed relationship among the fourth-shaft 326, the fifth-shaft 352 and a sixth-shaft 356. At least one gear-element from both the seventh and eighth gearing-arrangements 350, 354 are associated with both the fourth-shaft 326 and the fifth-shaft 352.

The seventh simple planetary-gearset 350 may connect at least one of the second-shaft 318 and the fourth-shaft 326. The seventh simple planetary-gearset 350 may have a seventh planet-gear 358 associated with the fourth-shaft 326. The seventh simple planetary-gearset 350 may also have a seventh sun-gear 360 associated with the sixth-shaft 356 and a seventh ring-gear 362 associated with the fifth-shaft 352. The eighth simple planetary-gearset 354 may also connect at least one of the second-shaft 318 and the fourth-shaft 326. The eighth simple-planetary-gearset 354 may have an eighth planet-gear 364 associated with the fifth-shaft 352. The eighth simple planetary-gearset 354 may also have an eighth sun-gear 366 associated with the sixth-shaft 356 and a eighth ring-gear 368 associated with the fourth-shaft 326.

The third-transmission 300 may have a second-brake 370 configured to selectively hold the fifth-shaft 352 against rotation. The third-transmission 300 may also have a third-brake 372 configured to selectively hold the sixth-shaft 356 against rotation.

FIG. 3a also shows the output-shaft 314 associated with a first end-gear 376 of the first simple planetary-gearset 312, and the input-shaft 322 is shown associated with a second end-gear 378 of the second simple planetary-gearset 320. The seventh simple planetary-gearset 350 and eighth simple planetary-gearset 354 are shown inter-associated by two shafts; an alpha-shaft 380 and a beta-shaft 382. At least one of the inter-associated shafts is associated with a gear-element in at least one of the first and second simple planetary-gearsets 312, 320; the beta-shaft 382 is associated with a gear-element in the second planetary-gearset 320.

The alpha-shaft 380 may be associated with a third end-gear 384 and a first interior-gear 386 of the seventh and eighth simple planetary-gearsets 350, 354, respectively. The beta-shaft 382 may be associated with a second interior-gear 390 and fourth end-gear 392 of the seventh and eighth simple planetary-gearsets 350, 354, respectively. The beta-shaft 382 may also be associated with a fifth end-gear 394 of the second simple planetary-gearset 320 opposite in the respective speed relationship of the second end-gear 378.

FIG. 3b illustrates a shift-element engagement chart for third-transmission 300. Third-transmission 300 may have the shift-elements engaged in varying combinations of three to establish ten forward speed ratios and three reverse speed ratios between input-shaft 322 and output-shaft 314.

Third-transmission 300 may start with a first speed by engaging the second-clutch 342, the third-clutch 344, and the second-brake 370. Third-transmission 300 may shift from the first speed to a second speed by disengaging the third-clutch 344 and the second-brake 370 and engaging the first-clutch 340 and third-brake 372. A subsequent third speed may be achieved by disengaging the first-clutch 340 and engaging the third-clutch 344. A subsequent fourth speed may be achieved by disengaging the third-clutch 344 and engaging the second-brake 370. A subsequent fifth speed may be achieved by disengaging the second-brake 370 and engaging the first-brake 346. A subsequent sixth speed may be achieved by disengaging the third-brake 372 and engaging the second-brake 370. A subsequent seventh speed may be achieved by disengaging the second-brake 370 and engaging the third-clutch 344. A subsequent eighth speed may be achieved by disengaging the second-clutch 342 and engaging the third-brake 372. A subsequent ninth speed may be achieved by disengaging the third-brake 372 and engaging the second-brake 370. A subsequent tenth speed may be achieved by disengaging the third-clutch 344 and engaging the third-brake 372.

Third-transmission 300 may also provide three reverse speeds. A first reverse speed may be achieved by engaging the third-clutch 344, the first-brake 346, and the second-brake 370. A second reverse speed may be achieved by engaging the third-clutch 344, the first-brake 346, and the third-brake 372. A third reverse speed may be achieved by engaging the first-clutch 340, the second-clutch 342, and the second-brake 370.

FIG. 3c is a chart of beta ratios that may be used with third-transmission 300. The first simple planetary-gearset 312 may have a beta ratio, beta 1, of 1.916. The second simple planetary-gearset 320 may have a beta ratio, beta 2, of 3.560. The seventh simple planetary-gearset 350 may have a beta ratio, beta 7, of 3.700. The eighth simple planetary-gearset 354 may have a beta ratio, beta 8, of 1.830.

When the gearing-arrangements have beta ratios as indicated in FIG. 3c, the speed ratios have the values indicated in the ratio column in FIG. 3b. The far right column in FIG. 3b also shows the steps between the speed ratios. For example, when the beta ratios of FIG. 3c apply to the third-transmission 300, the speed ratio for the first forward speed ratio is 3.803, the transmission may shift to the second forward speed having a second forward speed ratio of 3.148, and the resulting step between the first forward speed ratio and the second forward speed ratio will be 1.208.

Figures 4A, 4B, 4C:
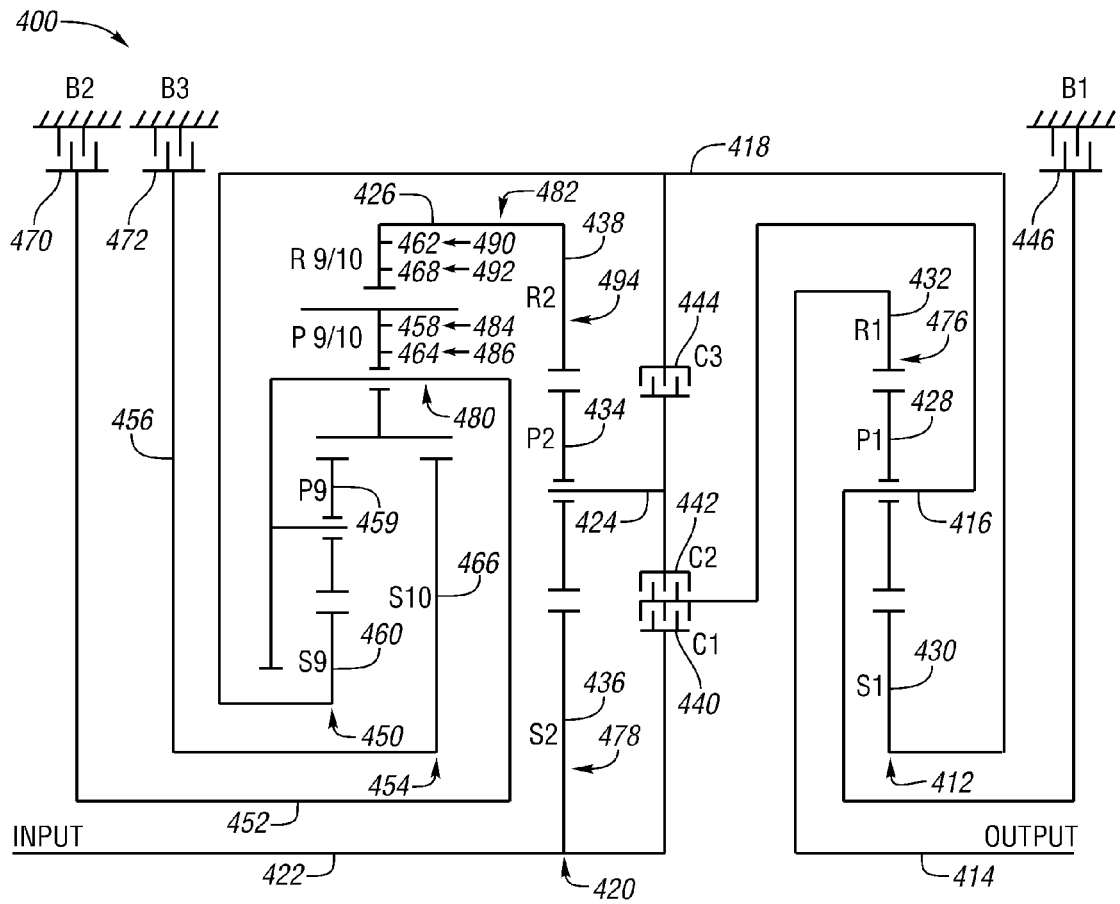

FIG. 4a shows a schematic diagram of a fourth-transmission 400. Regarding the fourth-transmission 400, a first gearing-arrangement 412 is shown which connects an output-shaft 414, a first-shaft 416 and a second-shaft 418. Similar to the first-transmission 100, the first gearing-arrangement 412 may be a first simple planetary-gearset 412 which is configured to impose a linear speed relationship among the output-shaft 414, the first-shaft 416 and the second-shaft 418. A second gearing-arrangement 420 is shown which connects an input-shaft 422, a third-shaft 424, and a fourth-shaft 426. Similar to the first-transmission 100, the second gearing-arrangement 420 may be a second simple planetary-gearset 420 which is configured to impose a linear speed relationship among the input-shaft 422, the third-shaft 424, and the fourth-shaft 426.

The first simple planetary-gearset 412 may have a first planet-gear 428 associated with the first-shaft 416. The first simple planetary-gearset 412 may also have a first sun-gear 430 associated with the second-shaft 418 and a first ring-gear 432 associated with the output-shaft 414. The second simple planetary-gearset 420 may have a second planet-gear 434 associated with the third-shaft 424. The second simple planetary-gearset 420 may also have a second sun-gear 436 associated with the input-shaft 422 and a second ring-gear 438 associated with the fourth-shaft 426.

Also similar to the first-transmission 100, the fourth-transmission 400 may have a first-clutch 440 configured to selectively couple the input-shaft 422 to the first-shaft 416, a second-clutch 442 configured to selectively couple the first-shaft 416 to the third-shaft 424, and a third-clutch 444 configured to selectively couple the second-shaft 418 to the third-shaft 424. As well the fourth-transmission 400 may have a first-brake 446 configured to selectively hold the first-shaft 416 against rotation.

Fourth-transmission 400 may have a ninth gearing-arrangement 450 which connects the second-shaft 418, the fourth-shaft 426, and a fifth-shaft 452. The ninth gearing-arrangement 450 may be a ninth double-pinion planetary-gearset 450 which is configured to impose a linear speed relationship among the second-shaft 418, the fourth-shaft 426, and the fifth-shaft 452. A tenth gearing-arrangement 454 may connect the fourth-shaft 426, the fifth-shaft 452 and a sixth-shaft 456. The tenth gearing-arrangement 454 may be a tenth simple planetary-gearset 454 which is configured to impose a linear speed relationship among the fourth-shaft 426, the fifth-shaft 452 and the sixth-shaft 456. At least one gear-element from both the ninth and tenth gearing-arrangements 450, 454 are associated with both the fourth-shaft 426 and the fifth-shaft 452.

The ninth double-pinion planetary-gearset 450 may connect at least one of the second-shaft 418 and the fourth-shaft 426. The ninth double-pinion planetary-gearset 450 may have a first ninth planet-gear 458 and a second ninth planet-gear 459 associated with the fifth-shaft 452. The ninth double-pinion planetary-gearset 450 may also have a ninth sun-gear 460 associated with the second-shaft 418 and a ninth ring-gear 462 associated with the fourth-shaft 426. The tenth simple planetary-gearset 454 may also connect at least one of the second-shaft 418 and the fourth-shaft 426. The tenth simple-planetary-gearset 454 may have a tenth planet-gear 464 associated with the fifth-shaft 452. The first ninth planet-gear 458 and the tenth planet-gear 464 may be a shared gear-element between the ninth gearing-arrangement 450 and the tenth gearing-arrangement 454 as shown. The tenth simple planetary-gearset 454 may also have a tenth sun-gear 466 associated with the sixth-shaft 456 and a tenth ring-gear 468 associated with the fourth-shaft 426. The ninth ring-gear 462 and the tenth ring-gear 468 may also be a shared gear-element as shown.

The fourth-transmission 400 may have a second-brake 470 configured to selectively hold the fifth-shaft 452 against rotation. The fourth-transmission 400 may also have a third-brake 472 configured to selectively hold the sixth-shaft 456 against rotation.

The ninth and tenth gearing-arrangements 450, 454, having two inter-associated shafts, may impose a linear speed relationship among four shafts; the second-shaft 418, the fourth-shaft 426, the fifth-shaft 452, and the sixth-shaft 456. The fourth-shaft 426 is inter-associated with the ninth ring-gear 462 and the tenth ring-gear 468, and the fifth-shaft 452 is inter-associated with the first ninth planet-gear 458 and the tenth planet-gear 464.

FIG. 4a also shows the output-shaft 414 associated with a first end-gear 476 of the first simple planetary-gearset 412, and the input-shaft 422 is shown associated with a second end-gear 478 of the second simple planetary-gearset 420. The ninth double-pinion planetary-gearset 450 and tenth simple planetary-gearset 454 are shown inter-associated by two shafts; an alpha-shaft 480 and a beta-shaft 482. At least one of the inter-associated shafts is associated with a gear-element in at least one of the first and second simple planetary-gearsets 412, 420; the beta-shaft 482 is associated with a gear-element in the second planetary-gearset 420.

The alpha-shaft 480 may be associated with a third end-gear 484 and a first interior-gear 486 of the ninth double-pinion and tenth simple planetary-gearsets 450, 454, respectively. The beta-shaft 482 may be associated with a second interior-gear 490 and fourth end-gear 492 of the ninth double-pinion and tenth simple planetary-gearsets 450, 454, respectively. The beta-shaft 482 may also be associated with a fifth end-gear 494 of the second simple planetary-gearset 420 opposite in the respective speed relationship of the second end-gear 478.

FIG. 4b illustrates a shift-element engagement chart for fourth-transmission 400. Fourth-transmission 400 may have the shift-elements engaged in varying combinations of three to establish ten forward speed ratios and three reverse speed ratios between input-shaft 422 and output-shaft 414.

Fourth-transmission 400 may start with a first speed by engaging the second-clutch 442, the third-clutch 444, and the second-brake 470. Fourth-transmission 400 may shift from the first speed to a second speed by disengaging the third-clutch 444 and the second-brake 470 and engaging the first-brake 446 and third-brake 472. A subsequent third speed may be achieved by disengaging the first-brake 446 and engaging the second-brake 470. A subsequent fourth speed may be achieved by disengaging the second-brake 470 and engaging the third-clutch 444. A subsequent fifth speed may be achieved by disengaging the third-clutch 444 and engaging the first-clutch 440. A subsequent sixth speed may be achieved by disengaging the first-clutch 440 and the third-brake 472 and engaging the first-brake 446 and the second-brake 470. A subsequent seventh speed may be achieved by disengaging the first-brake 446 and second-brake 470 and engaging the first-clutch 440 and the third-clutch 444. A subsequent eighth speed may be achieved by disengaging the second-clutch 442 and engaging the third-brake 472. A subsequent ninth speed may be achieved by disengaging the third-brake 472 and engaging the second-brake 470. A subsequent tenth speed may be achieved by disengaging the third-clutch 444 and engaging the third-brake 472.

Fourth-transmission 400 may also provide three reverse speeds. A first reverse speed may be achieved by engaging the third-clutch 444, the first-brake 446, and the second-brake 470. A second reverse speed may be achieved by engaging the third-clutch 444, the first-brake 446, and the third-brake 472. A third reverse speed may be achieved by engaging the first-clutch 440, the second-clutch 442, and the second-brake 472.

FIG. 4c is a chart of beta ratios that may be used with fourth-transmission 400. The first simple planetary-gearset 412 may have a beta ratio, beta 1, of 1.916. The second simple planetary-gearset 420 may have a beta ratio, beta 2, of 3.560. The ninth double-pinion planetary-gearset 450 may have a beta ratio, beta 9, of 3.700. The tenth simple planetary-gearset 454 may have a beta ratio, beta 10, of 1.830.

When the gearing-arrangements have beta ratios as indicated in FIG. 4c, the speed ratios have the values indicated in the ratio column in FIG. 4b. The far right column in FIG. 4b also shows the steps between the speed ratios. For example, when the beta ratios of FIG. 4c apply to the fourth-transmission 400, the speed ratio for the first forward speed ratio is 3.598, the transmission may shift to the second forward speed having a second forward speed ratio of 3.491, and the resulting step between the first forward speed ratio and the second forward speed ratio will be 1.031.

Figures 5A, 5B, 5C:
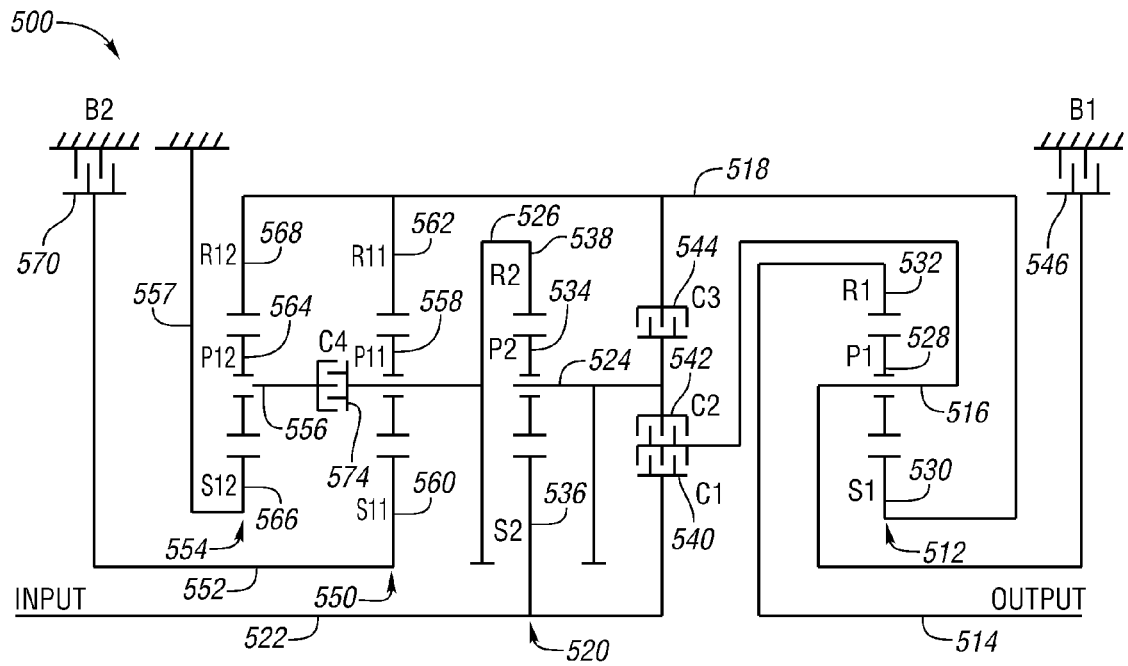
Figures 6A, 6B, 6C:
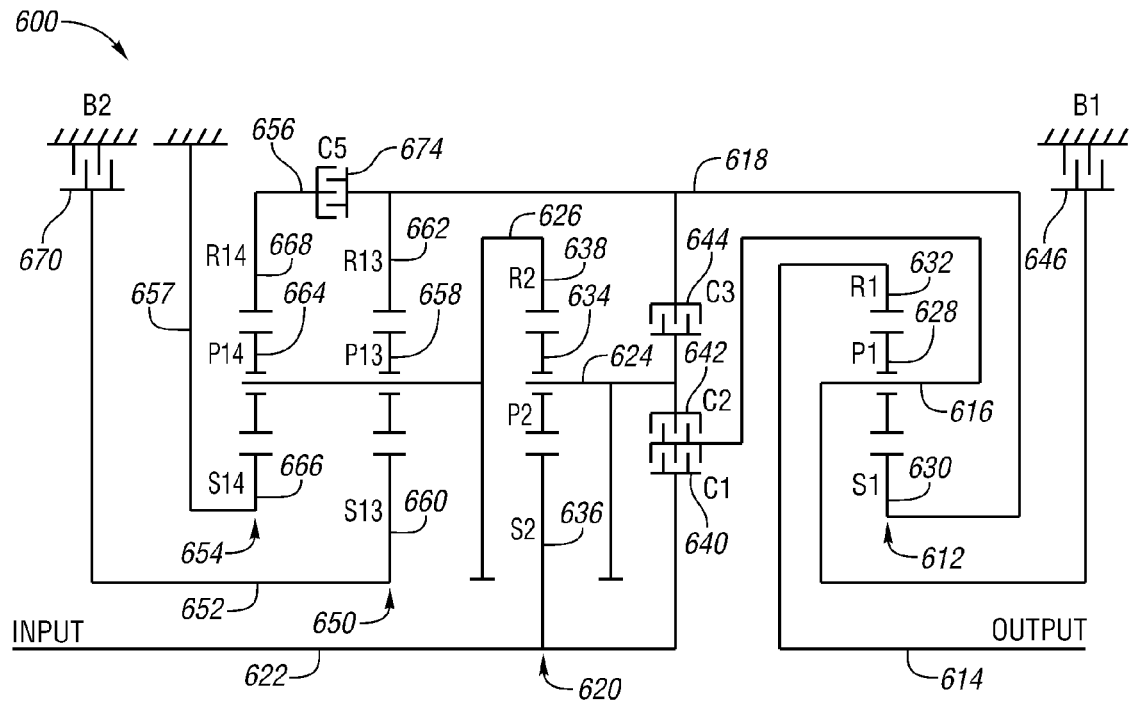

FIGS. 5a and 6a show a schematic diagram of a fifth-transmission 500 and a sixth-transmission 600, respectively. Regarding both the fifth-transmission 500 and sixth-transmission 600, first gearing-arrangements 512, 612 are shown connecting respective output-shafts 514, 614, first-shafts 516, 616 and second-shafts 518, 618. Similar to the first-transmission 100, the first gearing-arrangements 512, 612 may be first simple planetary-gearsets 512, 612 which are configured to impose a linear speed relationships among their respective output-shafts 514, 614, first-shafts 516, 616, and second-shafts 518, 618. The second gearing-arrangements 520, 620 are shown connecting respective input-shafts 522, 622, third-shafts 524, 624, and fourth-shafts 526, 626. Also similar to the first-transmission 100, the second gearing-arrangements 520, 620 may be second simple planetary-gearsets 520, 620 which are configured to impose a linear speed relationship among their respective input-shafts 522, 622, the third-shafts 524, 624, and the fourth-shafts 526, 626.

The first simple planetary-gearsets 512, 612 may have respective first planet-gears 528, 628 associated with the first-shafts 516, 616. The first simple planetary-gearsets 512, 612 may also have respective first sun-gears 530, 630 associated with second-shafts 518, 618 and first ring-gears 532, 632 associated with the output-shafts 514, 614. The second simple planetary-gearsets 520, 620 may have respective second planet-gears 534, 634 associated with the third-shafts 524, 624. The second simple planetary-gearsets 520, 620 may also have respective second sun-gears 536, 636 associated with the input-shafts 522, 622 and second ring-gears 538, 638 associated with the fourth-shafts 526, 626.

Also similar to the first-transmission 100, the fifth-transmission 500 and sixth-transmission 600 may each have a first-clutch 540, 640 configured to selectively couple the input-shaft 522, 622 to the first-shaft 516, 616, a second-clutch 542, 642 configured to selectively couple the first-shaft 516, 616 to the third-shaft 524, 624, and a third-clutch 544, 644 configured to selectively couple the second-shaft 518, 618 to the third-shaft 524, 624. As well the fifth-transmission 500 and sixth-transmission 600 may each have a first-brake 546, 646 configured to selectively hold the first-shaft 516, 616 against rotation.

The Fifth-transmission 500 may have an eleventh gearing-arrangement 550 which connects the second-shaft 518, the fourth-shaft 526, and a fifth-shaft 552. The sixth-transmission 600 may have a thirteenth gearing-arrangement 650 which also connects the second-shaft 618, the fourth-shaft 626, and a fifth-shaft 652. The eleventh and thirteenth gearing-arrangements 550, 650 may be eleventh and thirteenth simple planetary-gearsets 550, 650 which are each configured to impose a linear speed relationship among their respective second-shafts 518, 618, fourth-shafts 526, 626, and fifth-shafts 552, 652. The Fifth-transmission 500 may have a twelfth gearing-arrangement 554 connecting the second-shaft 518, a sixth-shaft 556, and a ground 557. The sixth-transmission 600, however, may have a fourteenth gearing-arrangement 654 connecting the fourth-shaft 626, a sixth-shaft 656, and a ground 657. The twelfth gearing-arrangement 554 may be a twelfth simple planetary-gearset 554 which is configured to impose a linear speed relationship among the second-shaft 518, the sixth-shaft 556, and the ground 557, whereas the fourteenth gearing-arrangement 654 may be a fourteenth simple planetary-gearset 654 which is configured to impose a linear speed relationship among the sixth-shaft 656, the fourth-shaft 626, and the ground 657.

The eleventh and twelfth simple planetary-gearsets 550, 554 may each connect at least one of the second-shaft 518 and the fourth-shaft 526 with other shafts. The thirteenth and fourteenth simple planetary-gearsets 650, 654 may also each connect at least one of the second-shaft 618 and the fourth-shaft 626 with other shafts. The eleventh and thirteenth simple planetary-gearsets 550, 650 may each have a respective eleventh and thirteenth planet-gear 558, 658 associated with the fourth-shaft 526, 626, and eleventh and thirteenth sun-gear 560, 660 associated with the fifth-shaft 552, 652, and an eleventh and thirteenth ring-gear 562, 662 associated with the second-shaft 518, 618.

The twelfth and fourteenth simple planetary-gearsets 554, 654 may also connect at least one of the second-shaft 518, 618 and the fourth-shaft 526, 626 with other shafts. The twelfth simple planetary-gearset 554 may have a twelfth planet-gear 564 associated with the sixth-shaft 556, whereas the fourteenth simple planetary-gearset 654 may have a fourteenth planet-gear 664 associated with the fourth-shaft 626. Conversely, the twelfth simple planetary-gearset 554 may have a twelfth ring-gear 568 associated with the second-shaft 518, whereas the fourteenth simple planetary-gearset 654 may have a fourteenth ring-gear 668 associated with a sixth-shaft 656. Both the twelfth and fourteenth simple planetary-gearsets 554, 654 may have their respective twelfth and fourteenth sun-gears 566, 666 grounded to the housing of the transmission, such that the sun-gears may not rotate.

The fifth-transmission 500 and the sixth-transmission 600 may both have a second-brake 570, 670 configured to selectively hold the fifth-shafts 552, 652 against rotation. The fifth-transmission 500 may have a fourth-clutch 574 configured to selectively couple the sixth-shaft 556 with the fourth-shaft 526. The sixth-transmission 600 may have a fifth-clutch 674 configured to selectively couple the sixth-shaft 656 with the second-shaft 618.

FIGS. 5b and 6b illustrate a shift-element engagement chart for fifth- and sixth-transmissions 500, 600. Both the fifth- and sixth-transmissions 500, 600, like the first-transmission 100 may have the shift-elements engaged in varying combinations of three to establish eleven forward speed ratios and two reverse speed ratios between respective input-shafts 522, 622 and output-shafts 514, 614. The shift-element engagement chart for the fifth-transmission 500 in FIG. 5b follows the same shift-element engagement/disengagement for each shift element of the first-transmission 100 in FIG. 1b, except the fourth-clutch 574 follows the same engagement/disengagement pattern as the third-brake 172. As well, the shift-element engagement chart for the sixth-transmission 600 in FIG. 6b follows the same shift-element engagement/disengagement for each shift element of the first-transmission 100 in FIG. 1b, except the fifth-clutch 674 follows the same engagement/disengagement pattern as the third-brake 172.

FIGS. 5c and 6c are charts of beta ratios that may be used with fifth- and sixth-transmissions 500, 600, which are shown by example to be the same as the first-transmission 100 beta ratios. When the same beta ratios from first-transmission 100 are used with the fifth-transmission 500 and the sixth-transmission 600, the same speed ratios and steps for each speed result.

Figures 7A, 7B, 7C:
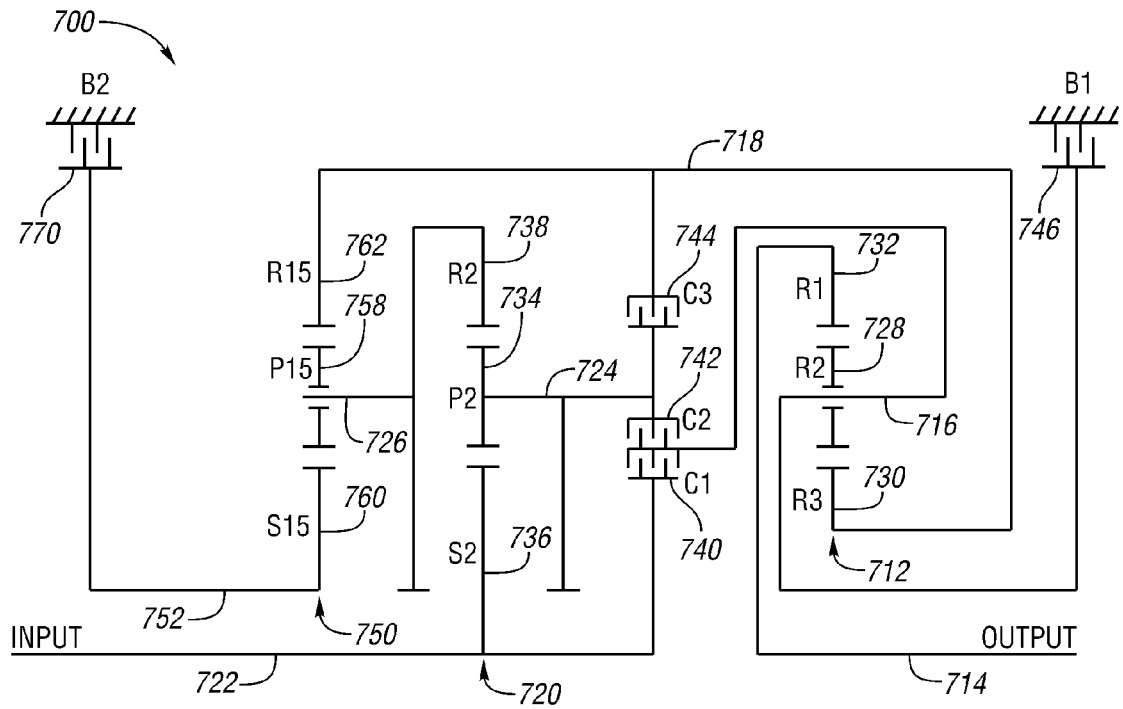
Figures 8A, 8B, 8C:
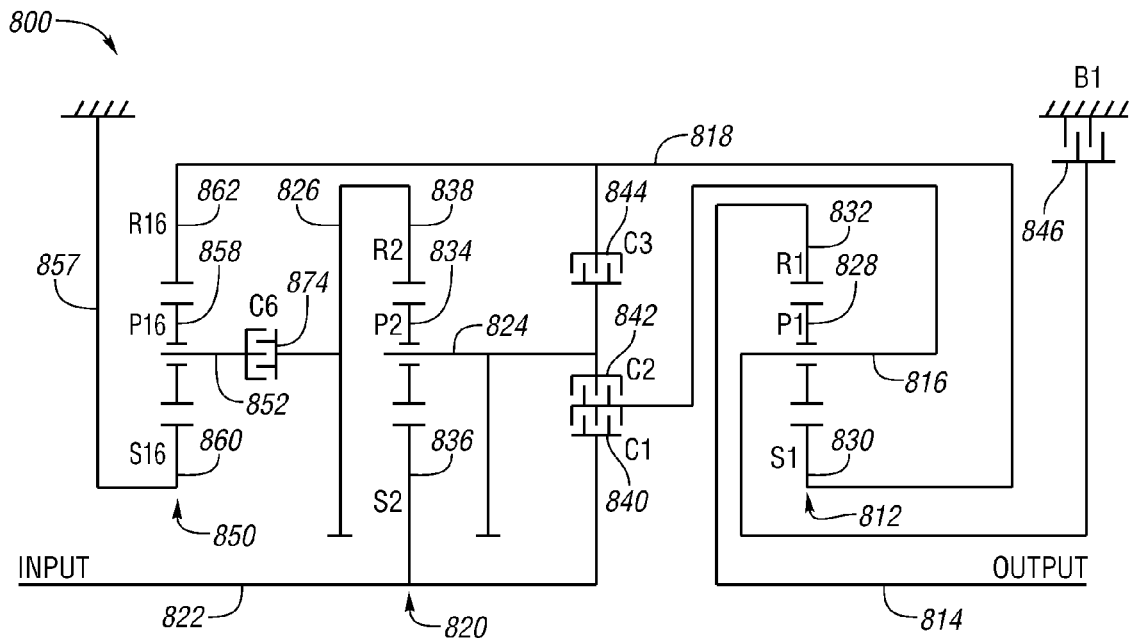
Figures 9A, 9B, 9C:
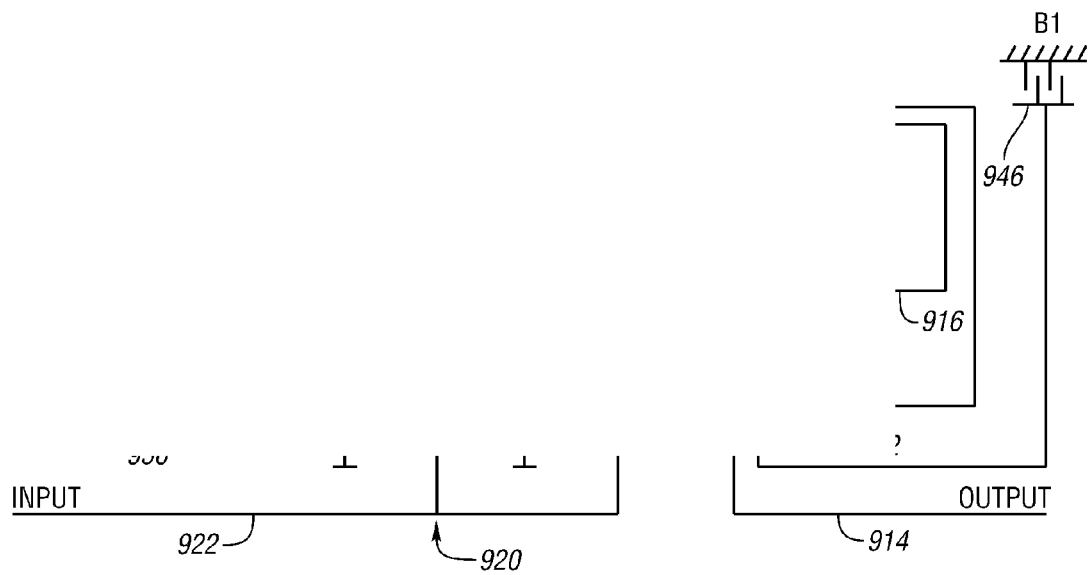

FIGS. 7a, 8a and 9a show schematic diagrams of a seventh-, eigth- and ninth-transmission 700, 800, 900. These three transmissions have only three gearing-arrangements that are similar in nature to many of the previous six transmissions. Regarding the seventh-, eight- and ninth-transmissions 700, 800, 900, a first gearing-arrangement 712, 812, 912 is shown which connects respective output-shafts 714, 814, 914, first-shafts 716, 816, 916 and second-shafts 718, 818, 918. Similar to the first-transmission 100, the first gearing-arrangements 712, 812, 912 may each be a first simple planetary-gearset 712, 812, 912 which are configured to impose a linear speed relationship among their respective output-shafts 714, 814, 914, first-shafts 716, 816, 916 and second-shafts 718, 818, 918. Second gearing-arrangements 720, 820, 920 are shown connecting respective input-shafts 722, 822, 922, third-shafts 724, 824, 924, and fourth-shafts 726, 826, 926. Similar to the first-transmission 100, the second gearing-arrangements 720, 820, 920 may be second simple planetary-gearsets 720, 820, 920 which are configured to impose a linear speed relationship among their respective input-shafts 722, 822, 922, third-shafts 724, 824, 924, and fourth-shafts 726, 826, 926.

The first simple planetary-gearsets 712, 812, 912 may have respective first planet-gears 728, 828, 928 associated with the first-shafts 716, 816, 916, first sun-gears 730, 830, 930 associated with the second-shafts 718, 818, 918, and first ring-gears 732, 832, 932 associated with the output-shafts 714, 814, 914. The second simple planetary-gearsets 720, 820, 920 may have respective second planet-gears 734, 834, 934 associated with third-shafts 724, 824, 924, second sun-gears 736, 836, 936 associated with input-shafts 722, 822, 922 and second ring-gears 738, 838, 938 associated with fourth-shafts 726, 826, 926.

Also similar to the first-transmission 100, the seventh-, eight-, and ninth-transmissions 700, 800, 900 may each have a first-clutch 740, 840, 940 configured to selectively couple the input-shafts 722, 822, 922 to the first-shafts 716, 816, 916, a second-clutch 742, 842, 942 configured to selectively couple the first-shafts 716, 816, 916 to the third-shafts 724, 824, 924, and a third-clutch 744, 844, 944 configured to selectively couple the second-shafts 718, 818, 918 to the third-shafts 724, 824, 924. As well the s seventh-, eight-, and ninth-transmissions 700, 800, 900 may each have a first-brake 746, 846, 946 configured to selectively hold the first-shafts 716, 816, 916 against rotation.

Seventh-transmission 700 may have a fifteenth gearing-arrangement 750 which connects the second-shaft 718, the fourth-shaft 726, and a fifth-shaft 752. Eighth-transmission 800 may have a sixteenth gearing-arrangement 850 which connects the second-shaft 818, a fifth-shaft 852 and a ground 857. Ninth-transmission 900 may have a seventeenth gearing-arrangement 950 which connects the fourth-shaft 926, and a fifth-shaft 952, and a ground 957.

The fifteenth gearing-arrangement 750 may be a fifteenth simple planetary-gearset 750 which is configured to impose a linear speed relationship among the second-shaft 718, the fourth-shaft 726, and the fifth-shaft 752. The sixteenth gearing-arrangement 850 may be a sixteenth simple planetary-gearset 850 which is configured to impose a linear speed relationship among the second-shaft 818, the fifth-shaft 852, and the ground 857. The seventeenth gearing-arrangement 950 may be a seventeenth simple planetary-gearset 950 which is configured to impose a linear speed relationship among the fifth-shaft 952, the fourth-shaft 926, and the ground 957.

The seventh-transmission 700 may have a seventeenth planet-gear 758 associated with the fourth-shaft 726, a seventeenth sun-gear 760 associated with the fifth-shaft 752, and a seventeenth ring-gear 762 associated with the second-shaft 718. The eighth-transmission 800 may have an eighteenth planet-gear 858 associated with the fifth-shaft 852, an eighteenth sun-gear 860 associated with the ground 857, and an eighteenth ring-gear 862 associated with the second-shaft 818. The ninth-transmission 900 may have a nineteenth planet-gear 958 associated with the fourth-shaft 926, a nineteenth sun-gear 960 associated with the ground 957, and a nineteenth ring-gear 962 associated with the fifth-shaft 952.

The seventh-transmission 700 may have a second-brake 770 configured to selectively hold the fifth-shaft 752 against rotation. The eighth-transmission 800 may have a sixth-clutch 874 which may selectively couple the fourth-shaft 826 to the fifth-shaft 852. The ninth-transmission 900 may have a seventh-clutch 974 which may selectively couple the second-shaft 918 to the fifth-shaft 952.

FIGS. 7b, 8b, and 9b illustrate shift-element engagement charts for the seventh-, eighth-, and ninth-transmissions 700, 800, 900. In these embodiments, seventh-, eighth-, and ninth-transmissions 700, 800, 900 are shown having the shift-elements engaged in varying combinations of three to establish five forward speed ratios and one reverse speed ratios between input-shafts 722, 822, 922 and output-shafts 714, 814, 914.

The shift-element engagement chart for the seventh-transmission 700 in FIG. 7b follows the same shift-element engagement/disengagement for each shift element of the first-transmission 100 in FIG. 1b, except the third-brake 172 is not in the chart, and every speed from FIG. 1b that included the third-brake in engagement has been removed. The shift-element engagement chart for the eighth- and ninth-transmissions 800, 900 in FIGS. 8b and 9b follows the same shift-element engagement/disengagement for each shift element of the seventh-transmission 700 in FIG. 7b, except the sixth- and seventh-clutches 874, 974 follow the same engagement/disengagement pattern as the second-brake 770.

FIGS. 7c, 8c, and 9c are charts of beta ratios that may be used with seventh-, eighth-, and ninth-transmissions 700, 800, 900, which are shown by example to be the same as the first-transmission 100 beta ratios for all of the speeds which do not include engagement of the third-brake 172.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A transmission comprising:
a first gearing-arrangement configured to impose a linear speed relationship among an output-shaft, a first-shaft, and a second-shaft;
a second gearing-arrangement configured to impose a linear speed relationship among an input-shaft, a third-shaft, and a fourth-shaft;
a third gearing-arrangement configured to impose a linear speed relationship among the second-shaft, the fourth-shaft, and a fifth-shaft
a fourth gearing-arrangement configured to impose a linear speed relationship among the second-shaft, the fourth-shaft, and a sixth-shaft;
a first-clutch configured to selectively couple the input-shaft to the first-shaft;
a second-clutch configured to selectively couple the first-shaft to the third-shaft;
a third-clutch configured to selectively couple the second-shaft to the third-shaft; and
a first-brake configured to selectively hold the first-shaft against rotation.

2. The transmission of claim 1, wherein the first gearing-arrangement is a simple planetary-gearset with a first planet-gear associated with the first-shaft, and the second gearing-arrangement is a simple planetary-gearset with a second planet-gear associated with the third-shaft.

3. The transmission of claim 1, wherein the third gearing-arrangement is a simple planetary-gearset with a third planet-gear associated with the fourth-shaft.

4. The transmission of claim 1, further comprising a second-brake configured to selectively hold the fifth-shaft against rotation.

5. The transmission of claim 1, wherein the fourth gearing-arrangement is a simple planetary-gearset with a fourth planet-gear associated with the fourth-shaft.

6. The transmission of claim 1, further comprising a third-brake configured to selectively hold the sixth-shaft against rotation.

7. A transmission comprising:
a first gearing-arrangement configured to impose a linear speed relationship among an output-shaft, a first-shaft, and a second-shaft;
a second gearing-arrangement configured to impose a linear speed relationship among an input-shaft, a third-shaft, and a fourth-shaft;
a third gearing-arrangement configured to impose a linear speed relationship among the second-shaft, the fourth-shaft, and a fifth-shaft;
a fourth gearing-arrangement configured to impose a linear speed relationship among the fourth-shaft, the fifth-shaft and a sixth-shaft;
a first-clutch configured to selectively couple the input-shaft to the first-shaft;
a second-clutch configured to selectively couple the first-shaft to the third-shaft;
a third-clutch configured to selectively couple the second-shaft to the third-shaft; and
a first-brake configured to selectively hold the first-shaft against rotation.

8. The transmission of claim 7, wherein the fourth gearing-arrangement is a planetary-gearset with a fourth planet-gear associated with the sixth-shaft.

9. The transmission of claim 7, further comprising a third-brake configured to selectively hold the sixth-shaft against rotation.

10. The transmission of claim 7, wherein the fourth gearing-arrangement shares a gear with the third gearing-arrangement.

11. The transmission of claim 7, wherein the third gearing-arrangement is a double-pinion planetary-gearset.

12. The transmission of claim 7, wherein the first gearing-arrangement is a simple planetary-gearset with a first planet-gear associated with the first-shaft, and the second gearing-arrangement is a simple planetary-gearset with a second planet-gear associated with the third-shaft.

13. The transmission of claim 7, further comprising a second-brake configured to selectively hold the fifth-shaft against rotation.

14. A transmission comprising:
a first planetary-gearset connecting an output-shaft, a first-shaft, and a second-shaft;

a second planetary-gearset connecting an input-shaft, a third-shaft, and a fourth-shaft;

a third planetary-gearset connecting the second-shaft and the fourth-shaft;

a fourth planetary-gearset having a sun-gear coupled to ground;

a first-clutch coupling the input-shaft and first-shaft;

a second-clutch coupling the first-shaft and third-shaft;

a third-clutch coupling the second-shaft and third-shaft; and a first-brake on the first-shaft.

15. The transmission of claim 14, wherein the third planetary-gearset connects the second-shaft, fourth-shaft and a fifth-shaft, and further comprising a second-brake on the fifth-shaft.

16. The transmission of claim 14, wherein the first planetary-gearset has a first sun-gear associated with the second-shaft, a first planet-gear associated with the first-shaft, and a first ring-gear associated with the output-shaft, wherein the second planetary-gearset has a second sun-gear associated with the input-shaft, a second planet-gear associated with the third-shaft, and a second ring-gear associated with the fourth-shaft, and wherein the third planetary-gearset has a third sun-gear associated with a fifth-shaft, a third planet-gear associated with the fourth-shaft, and a third ring-gear associated with the second-shaft.

17. The transmission of claim 14, wherein the fourth planetary-gearset connects the second-shaft, the fourth-shaft, and a sixth-shaft.

18. The transmission of claim 17, wherein the first planetary-gearset has a first sun-gear associated with the second-shaft, a first planet-gear associated with the first-shaft, and a first ring-gear associated with the output-shaft, wherein the second planetary-gearset has a second sun-gear associated with the input-shaft, a second planet-gear associated with the third-shaft, and a second ring-gear associated with the fourth-shaft, wherein the third planetary-gearset has a third sun-gear associated with a fifth-shaft, a third planet-gear associated with the fourth-shaft, and a third ring-gear associated with the second-shaft, and wherein the fourth planetary-gearset has a fourth sun-gear associated with the sixth-shaft, a fourth planet-gear associated with the fourth-shaft, and a fourth ring-gear associated with the second-shaft, and further comprising a second-brake on the fifth-shaft and a third-brake on the sixth-shaft.

* * * * *